Jan. 20, 1970  A. E. HILL  3,491,309
PULSED CARBON DIOXIDE LASER WITH HIGH VOLTAGE
GRADIENT AND HIGH GAS PRESSURE
Filed Oct. 5, 1966  2 Sheets-Sheet 1

INVENTOR.
ALAN E. HILL

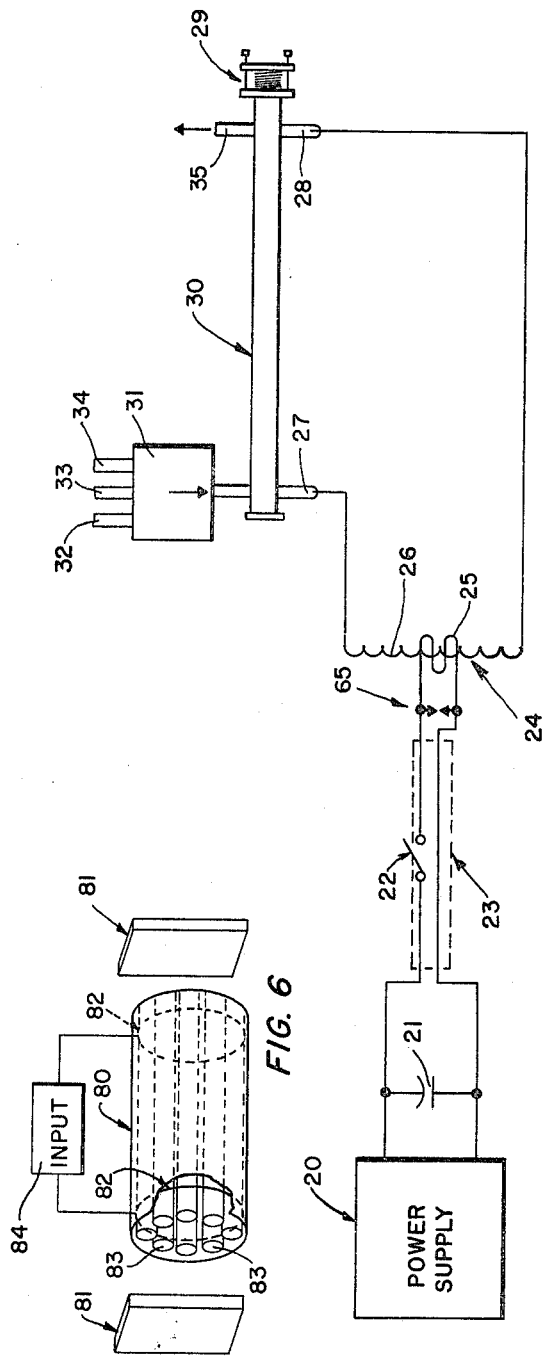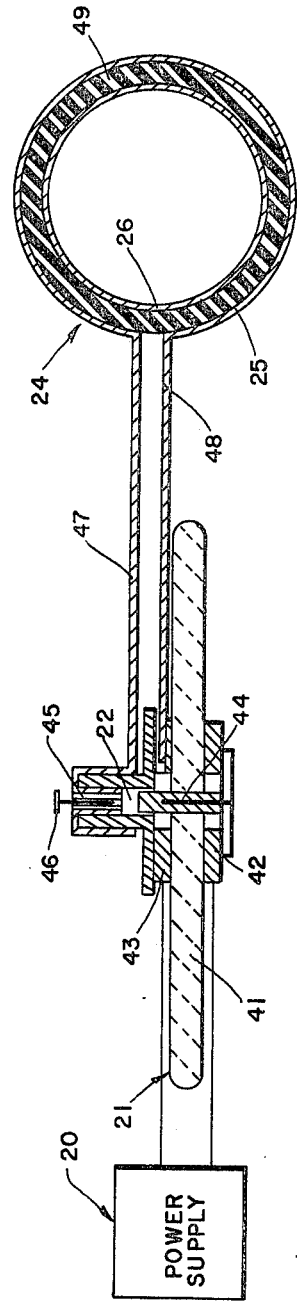

United States Patent Office 3,491,309
Patented Jan. 20, 1970

3,491,309
PULSED CARBON DIOXIDE LASER WITH HIGH VOLTAGE GRADIENT AND HIGH GAS PRESSURE
Alan Eugene Hill, Ann Arbor, Mich., assignor, by mesne assignments, to Laser Systems Corporation, a corporation of Delaware
Filed Oct. 5, 1966, Ser. No. 584,603
Int. Cl. H01s 3/09, 3/22
U.S. Cl. 331—94.5
14 Claims

ABSTRACT OF THE DISCLOSURE

A pulsed carbon dioxide laser is disclosed in which the pumping pulse is supplied by direct electrical discharge in such a manner that the most favorable period of the time changing electrodynamic properties of the gas are utilized for excitation thereof so as to obtain improved operating characteristics including high peak power. The laser gas pressure is of high value and the voltage gradient developed by the applied pumping pulses is correlated therewith at high value; the pumping pulse amplitude, duration and repetition rate are correlated with the other parameters in such a manner as to impart maximum pumping energy to the gas without producing an arc streamer discharge therein.

---

This invention relates to gaseous laser systems and/or methods of operation therefor. More particularly, this invention relates to an apparatus and/or method for pumping gaseous lasers such that efficiency rates thereof may be markedly increased and/or certain heretofore plaguing physical constraints may be removed.

Presently available gaseous laser systems suffer from a number of distinct disadvantages which have minimized their commercial utility. Two of the more important of these disadvantages are (1) low electrical input to photon conversion efficiencies and (2) restriction of maximum useful laser tube diameter which results in a awkward physical configurations. These disadvantages are attributed to relatively unexplained equilibrium electrodynamic conditions in a steady electrical discharge. For example, it has been necessary heretofore to utilize a small diameter lasing tube approximately 40 feet in length to provide sufficient plasma to generate a 1000 watt output. Also, the maximum obtained efficiency has run only in the neighborhood of 13 percent. The disadvantages of such systems are evident and, it is believed, merit little further comment.

It is an object of this invention to provide a gaseous laser system and/or method of operating the same which is not subject to the disadvantages outlined above.

More particularly, it is an object of this invention to provide such a system and/or method wherein the electrical energy input to photon conversion efficiencies significantly exceed those achieved in previous systems.

It is an object of this invention to provide a system and/or method wherein the diameter of the lasing tube may be expanded beyond that previously practical, thus allowing a greater power output per unit length than previously attainable.

It is an object of this invention to provide a system and/or method of the type described wherein the diameter of the lasing tube may be expanded beyond that previously practical and, thus, to allow a given quantity of gas to be enclosed within an envelope of shorter physical dimension.

It is an object of this invention to provide a novel pumping apparatus and/or method for a system of the type described which utilizes repeatedly the most efficient portion of the lasing period to generate an output signal.

It is an object of this invention to provide a system of the type described wherein average power output may be maintained at acceptable levels while peak powers are extended far above those previously achieved.

It is an object of this invention to provide a system of the type described above wherein the output efficiency of a mechanical or electro-optical Q switch device may be significantly increased over that previously available.

These, as well as other objects of this invention, will be readily understood by those skilled in the art with reference to the following specification and accompanying figures in which:

FIG. 2 is a schematic diagram of a laser system embodying a pumping apparatus designed in accordance with the teachings of this invention;

FIG. 5 is a cross-sectional view taken along plane V—V of FIG. 4; and

FIG. 6 is a perspective view of a modified lasing apparatus.

Briefly, this invention comprises the method of pumping a gas laser tube having preset pressure parameters and a predetermined volume of gas comprising steps of storing at least a predetermined minimum energy quantity sufficient to cause said predetermined volume to lase, and injecting said predetermined quantity into the gas to excite lasing action therein within a time interval sufficiently short that time changing electro-dynamic conditions do not substantially reduce the output per unit volume during said interval. More particularly, this invention comprises a method of and/or an apparatus for injecting electrical energy of extremely short duration having an extremely high voltage into the tube such that the tube impedance limits current flow within modest ranges and the voltage gradient remains high throughout the volume of the tube during the injecting interval.

Structurally, the invention may comprise a storage capacitor suitably connected for periodic charging to a power supply having its output transferred via a spark gap type of valve to the primary coil of a step-up transformer. The output leads of the transformer are connected directly to the laser excitation electrodes via a low inductance coupling. If desired, the voltage gradient may be set up along the tube by means of a plurality of such excitation configurations distributed axially along the laser tube.

Figure 1:
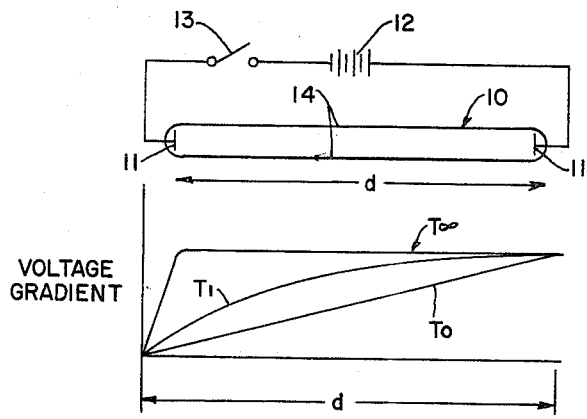
FIG. 1 is a graphical representation of the electrical potential along a conventional gaseous laser tube as currently visualized by those skilled in the art.

By way of presently accepted theoretical explanation, reference is made initially to FIG. 1 which is a graphical representation of the electrical potential as a function of distance, $d$, from the negative terminal of a conventional gaseous laser tube. The tube 10 is excited by a conventional DC pumping source 12 applied at plates 11 and, for purposes of illustration, a switch 13 is placed in series therewith. The tube may contain, for example, a conventional carbon dioxide lasing medium with, of course, suitable arrangements for gas circulation, energy reflection and energy amplification. Such a medium, as is well-known in the art, usually consists of various mixtures of $CO_2$, nitrogen and helium.

It is assumed generally that maximum pumping efficiency will be achieved when a uniform potential gradient is maintained throughout the length of the tube. It is not necessary, of course, that the gradient be absolutely constant, but it is important that so-called static regions within the tube wherein little or no gradient exists be avoided, since such regions do not accelerate electrons traveling therein and, that so-called steep gradients be avoided since they tend to overexcite the adjacent portion of the gas volume and dissipate energy.

In a typical present-day $CO_2$ continuous laser (as illustrated in FIG. 1), the axial potential gradient across the tube assumes the configuration $T_0$ the instant switch 13 is closed. This configuration precedes any ionization which occurs within the plasma shortly after the potential application. As ionization occurs the ions and their associated electrons begin to separate into electrically induced space charge distributions causing the electrical potential to shift towards that indicated at $T_1$ in FIG. 1.

If the walls 14 of the tube were not present during this shift, it is believed that the electrical potential would finally assume the approximate configuration indicated at $T\infty$ so that most of the potential drop occurred at the cathode. This configuration, of course, would not cause acceleration of electrons within those sections of the tube removed from the cathode and the associated collisions which result in the population inversions necessary to initiate and maintain lasing. It is believed, however, that the walls 14 function to permit a certain recombination rate of positive ions and electrons upon collision of the molecules with the wall and, thus, reduce the space charge distributions which cause flattening of the potential curve. This constant reduction, in turn, allows the maintenance of a potential function such as that shown at $T_1$ in FIG. 1 in the steady state case, and, thus, allows continuous lasing to occur at an efficiency seldom in excess of 10 percent.

Previous attempts to increase the diameter of the laser tube and, thereby, increase the energy storage per unit length have not met with any degree of success. It is believed that this failure is due in part to the attendant increase of positive ion diffusion time to the walls and, therefore, the lack of sufficient ion-electron recombinations to retain the potential function in a configuration such as that indicated by $T_1$. Consequently, a potential function such as indicated by $T\infty$ results and a very large percentage of this discharge volume is rendered inactive.

Regardless, however, of the accuracy of this explanation, it has been discovered that a lasing operation of extremely high efficiency may be executed within a tube of relatively conventional or larger cross-section by periodically pulsing the input electrodes with a pulse having the following properties:

(1) A time interval or duration period which is sufficiently long to allow injection of at least the minimum energy quantity necessary to initiate lasing within the gaseous volume and, yet, sufficiently short that changing electrodynamic conditions within the tube do not substantially reduce the lasing volume or result in inefficient excitation of the lasing gas.

(2) The amplitude must be sufficiently high to deliver the prescribed energy quantity to the plasma within the period allowed which factor, of course, depends upon the impedance of the gas (which of course is a function of cross sectional area of tube gas pressures, and time).

(3) The spacing between injected pulses must be great enough to allow sufficient ion recombination time and terminal state depopulation time.

When conditions (1), (2) and (3) are met, the current density will be kept sufficiently low to prevent an arc streamer discharge in the tube, thus maintaining a moderately uniform current density in the tube.

In addition to the outlined pumping pulse characteristics, it may also be necessary to adjust the relative pressures of the various components of the gaseous lasing medium in order to obtain optimum performance characteristics for a particular lasing medium confined within a particular physical configuration. No accurate theoretical explanation is currently available to dictate this adjustment and, thus, it must be made to some extent on a trial and error basis. It has been found, for example, that when a conventional $CO_2$ lasing medium is utilized in a particular three-fourth inch diameter laser tube, the nitrogen and $CO_2$ pressures should be increased at least three times over normal optimum steady state parameters—i.e. when the particular enveloping tube is utilized in a DC excited, steady state lasing environment. Optimum pressures for such DC excited systems may be determined readily by those skilled in the art.

By way of further example, a gaseous mixture of the type described under the noted pressures was circulated through a lasing tube having an inside diameter of three-fourths of one inch and a length of four feet. A ten meter focal length gold mirror and a germanium resonant reflector were supported by an internal bellows arrangement at either end of the tube and pumping pulses having the described characteristics were supplied thereto by means of conventional neon sign electrodes. A high-voltage pulse of approximately 100,000 volts per meter and a current of approximately 10 amps per square inch was injected into the tube by the device to be described hereinafter. The time interval of the pulse was approximately $2 \times 10^{-6}$ seconds and the repetition rates were 60 to 120 pulses per second. The particular device produced an output of 60 to 120 pulses per second having peak powers estimated to be in the 25 kilowatt range with an average power output of approximately 15 watts.

Referring now to FIG. 2, the pulse generating apparatus comprises a standard ferro-resonant power supply providing from 4,000 to 6,000 volts at a controllable current rate of approximately 50 to 100 milliamps. The output of power supply 20 is connected across the plates of a low inductance storage capacitor of approximately 0.05 microfarad. The capacitor discharges through a low inductance spark gap 22 upon reaching a predetermined breakdown voltage. The discharge is routed via low inductance leads 23 to the primary coil 25 of a transformer 24 having a secondary winding indicated generally by the reference numeral 26. Transformer 24 has a five turn primary and a 300 turn secondary and is capable of producing 360,000 volt–500 kilocycle ringing exponentially damped pulses with high efficiency. The output from transformer secondary 26 is applied to the interior electrodes of the laser as indicated at 27 and 28.

The lasing gas is constantly circulated through the laser tube. Conveniently, the three, for example, differing gaseous components may be channeled into a mixing reservoir 31 via conduits 32, 33 and 34. From the reservoir 31, the gas enters the lasing tube, passes therealong and is withdrawn at 35 by conventional means such as a pump. A conventional bellows arrangement 29 is provided to adjust the interior mirrors of the laser.

Figure 4:
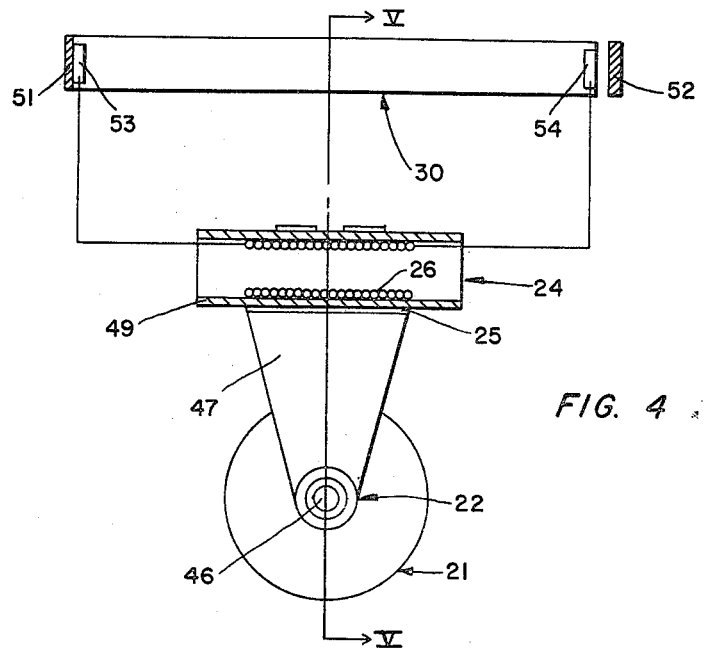
FIG. 4 is a schematic, plan view of a gaseous lasing system fabricated in accordance with the teachings of this invention.

Referring now additionally to FIGS. 4 and 5, capacitor 21 preferably comprises a dielectric section 41 having plates 42 and 43 which are connected directly to the power supply 20. As the charge on the capacitor builds to a predetermined point, it arks or sparks across gap 22 between contacts 44 and 45 and is routed to the primary of transformer 44 via two low-inductance leads 47 and 48. Conveniently, a switch mechanism 46 may be provided for manually activating pulse emission from the capacitor-storage network. The insulation 49 between transformer primary coil 25 and secondary coil 26 may conveniently comprise a layer of Mylar having a thickness of approximately one inch.

As shown best in FIG. 4, the output from secondary 26 is transmitted, again by low-inductance leads, to electrodes 53 and 54 within the tube 30. The reference numeral 51, of course, indicates a conventional mirror and the reference numeral 52 a germanium resonant reflector which has been found of some added value in the present system.

Depending upon the charging rate of power supply, 20, the charge on dielectric member 41 will periodically build to the predetermined gapping point and a pulse will be emitted into the primary winding 25 of the transformer. The voltage of this pulse will be stepped up by the transforming action and the resultant pulse is delivered to the electrodes of the laser tube. The time interval between pulse deliveries is governed, of course, by the charging rate of capacitor 21.

Figure 3:
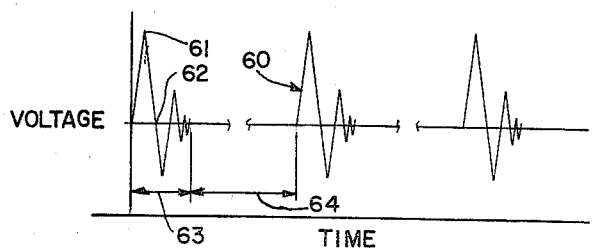
FIG. 3 is a graphical representation of applied voltage against time.

The resultant pulse resembles the configuration illustrated in FIG. 3 having a high-voltage amplitude 61, a duration period 63 and a pulse interval 64. If the particular operating conditions render it necessary to cut off the damped section of pulse 60 (for example, at 62) a crowbar switch 65 (see FIG. 2) may be inserted across the leads of the transformer primary 25.

The laser output pulses from this system were in the 10 micron wavelength region, having a pulse duration of approximately 10 microseconds and a peak power of 15–25 kilowatts. It is anticipated that by using a mechanical or electro-optical Q switch in combination with this system that peak powers of several megawatts can be obtained with relatively high efficiency.

As noted previously in this specification, the excitation pulse which is utilized is of extremely high voltage and, yet, causes only a moderate current density within the gas volume of the tube. This current is, of course, directly related to the tube impedance which changes rapidly as a function of time subsequent to the application of the voltage gradient thereacross. Certainly, the increased pressures within the tube utilized in the practice of this invention restrict the initial current density within the tube by retarding excess ionization of the gas. Other factors, however, such as tube configuration, the particular gases utilized and the like must be considered in deriving the proper wave form characteristics of the excitation pulse for a particular system.

FIG. 6 shows a lasing system wherein the single envelope shown in FIGS. 2 and 4 has been replaced by an outer envelope 80 having a plurality of parallel tubes 83 of smaller diameter disposed therein. The potential is applied to the tubes 83 by means of electrodes 82 which are connected to a suitable power source such as that previously discussed. Suitable cavity optic members 81 are provided at either extremity of the envelope 80.

The provision of smaller tubes 83 tends to decrease the positive ion diffusion time to the walls resulting in an increase in the recombination rate. This rate may be increased also by introducing other types of gases into the system.

Finally, it may be desirable under certain conditions to apply a positive pulse to the tube walls immediately after the occurrence of each laser pulse. This process, of course, again decreases positive ion diffusion time resulting in an increase in the maximum repetition rate.

While a preferred embodiment of this invention has been described in detail along with a minor modification thereof, it will be apparent to those skilled in the art that an almost endless variety of other embodiments may be conceived and fabricated without departing from the spirit of this specification and the accompanying drawings.

I claim:

1. A gas laser adapted for pulsed operation comprising a gas laser tube containing a volume of gas including nitrogen and carbon dioxide, means for maintaining the partial pressures of said nitrogen and carbon dioxide at least three times greater than the value at which said tube will lase optimally under a D.C. pumping signal when said tube is utilized as a steady state laser, means for storing at least the energy quantity which is necessary to cause said volume to lase and means for injecting said quantity into said gas within a time interval sufficiently short that time-changing electrodynamic conditions do not substantially reduce the laser output per unit volume of said tube within said time interval.

2. A carbon dioxide laser adapted for pulsed operation at high peak power and comprising; an envelope, carbon dioxide gas within said envelope, means defining a resonant cavity extending through said gas, a pair of spaced electrodes disposed in operative relation to said gas for supplying pumping energy thereto, electrical pulse generating means connected across said electrodes and adapted to produce a voltage pulse of predetermined amplitude and duration thereacross to inject substantially the maximum useful pulse energy into said gas in a given time interval, said predetermined amplitude of the voltage pulse being such that the voltage gradient in said gas is in excess of about 100,000 volts per meter and is high enough to inject sufficient power into the gas to exceed the threshold value required to initiate lasing action, said predetermined duration of the voltage pulse being that at which the energy injected by the pulse is substantially maximized without exceeding the value which, at said predetermined amplitude of the voltage pulse, would produce an arc streamer discharge in the gas, and means for maintaining the pressure of said gas at a value which, at said predetermined amplitude of the voltage pulse, is above that at which an arc streamer discharge would occur and below that at which lasing action would cease.

3. A carbon dioxide laser adapted for pulsed operation at high peak power and comprising; an envelope, means for introducing a gaseous mixture of carbon dioxide gas and at least one auxiliary gas into said envelope, means for defining a resonant cavity extending through said envelope, a pair of spaced electrodes disposed adjacent the envelope and adapted to supply pumping energy to a gaseous mixture within the envelope, electrical pulse generating means connected across said electrodes and adapted to product a voltage pulse of predetermined amplitude and duration thereacross, means for maintaining the partial pressures of a gaseous mixture within the envelope at values at least three times greater than the optimum values utilized in a D.C. excited steady state laser, said predetermined amplitude of the voltage pulse being such that the value of voltage gradient in a portion of the envelope adapted to be occupied by said gaseous mixture is high enough to inject sufficient power into said gaseous mixture to exceed the threshold value required to initiate lasing action, said predetermined duration of the voltage pulse being of such value that the energy injected by the pulse is substantially maximized without exceeding the value which, at said predetermined amplitude of the voltage pulse, would produce an arc streamer discharge in the gaseous mixture.

4. The method of operating a carbon dioxide laser of the type comprising an envelope with carbon dioxide gas therein, a resonant cavity extending through said gas and a pair of spaced electrodes disposed in operative relation to the gas with an electrical pulse generating means connected across the electrodes for supplying pumping energy to the gas, said method being adapted to produce high peak power and comprising the steps of; applying a voltage pulse of predetermined amplitude and duration across said electrodes to inject substantially the maximum useful pulse energy into said gas in a given time interval, the predetermined amplitude of the voltage pulse being such that the voltage gradient in said gas is in excess of about 100,000 volts per meter and is high enough to inject sufficient power into said gas to exceed the threshold value required to initiate lasing action, the predetermined duration of the voltage pulse being that at which the energy injected by the pulse is substantially maximized without exceeding the value which, at the predetermined amplitude of the voltage pulse, would produce an arc streamer discharge in the gas; and maintaining the pressure of said gas in said envelope at a value which, at the predetermined amplitude of the voltage pulse, is above that at which an arc streamer discharge would occur and below that at which lasing action would cease.

5. A carbon dioxide laser adapted for pulsed operation at high peak power and comprising; an envelope, a gaseous mixture of carbon dioxide gas and at least one auxiliary gas within said envelope, means for regulating the partial pressures of said gases at predetermined values, means defining a resonant cavity extending through said gaseous mixture, a pair of spaced electrodes disposed in operative relation to said gaseous mixture for supplying pumping energy thereto, electrical pulse generating means connected across said electrodes and adapted to produce a voltage pulse of predetermined amplitude and duration thereacross, said predetermined amplitude of the voltage pulse being such that the value of voltage gradient is high enough to inject power into the gaseous mixture in excess of the threshold value required to initiate lasing action, said excess being an amount limited only by the tendency of said gaseous mixture to support an arc streamer discharge, said predetermined values of partial pressures of gases being sufficiently high to prevent the occurrence of an arc streamer discharge.

6. A carbon dioxide laser adapted for pulsed operation at high peak power and pulse repetition rate and comprising; an envelope, a gaseous mixture of carbon dioxide gas and at least one auxiliary gas within said envelope, means for regulating the partial pressures of said gases at predetermined values, means defining a resonant cavity extending through said gaseous mixture, a pair of spaced electrodes disposed in operative relation to said gaseous mixture for supplying pumping energy thereto, electrical pulse generating means connected across said electrodes and adapted to produce voltage pulses thereacross of predetermined amplitude, duration and repetition rate, said predetermined amplitude of the voltage pulses being such that the voltage gradient in said gaseous mixture is at least as high as 100,000 volts per meter and being high enough to inject sufficient power into the gaseous mixture to initiate lasing action, said predetermined values of partial pressures of said gaseous mixture being sufficiently high to prevent the occurrence of an arc streamer discharge, and the interval between pulses being long enough to avoid causing an arc streamer discharge.

7. A carbon dioxide laser adapted for pulsed operation at high peak power and pulse repetition rate and comprising; an envelope, a gaseous mixture of carbon dioxide gas and at least one auxiliary gas within said envelope, means for regulating the partial pressures of said gases at predetermined values, a resonant cavity extending through said gaseous mixture, a pair of spaced electrodes disposed in operative relation to said gaseous mixture for supplying pumping energy thereto, electrical pulse generating means adapted to develop pulses of predetermined voltage amplitude, duration and repetition rate, said pulse generating means being connected across said electrodes, said predetermined values of partial pressure of said gases being at least three times greater than the optimum value utilized in a DC excited steady state laser, said predetermined amplitude of the voltage pulses being such that the value of the voltage gradient is high enough to inject sufficient power into the gaseous mixture to initiate lasing action without causing the occurrence of an arc streamer discharge, the duration of each voltage pulse being of such value that the energy injected by the pulse is substantially maximized without exceeding the value which, at said predetermined amplitude of the voltage pulse, would produce an arc streamer discharge in the gaseous mixture, the predetermined pulse repetition rate providing an interval between pulses long enough to avoid causing an arc streamer discharge.

8. The method of operating a carbon dioxide laser of the type comprising an envelope containing a gaseous mixture of carbon dioxide gas and at least one auxiliary gas, a resonant cavity extending through said gaseous mixture and a pair of spaced electrodes disposed in operative relation to the gaseous mixture for supplying pumping energy thereto, said method being adapted to produce high peak power and pulse repetition rate and comprising the steps of; applying voltage pulses of predetermined amplitude, duration and repetition rate across said electrodes to inject substantially the maximum useful pulse energy into said gaseous mixture in a given time interval, maintaining the partial pressures of said gases at values at least three times greater than the optimum values utilized in a DC excited steady state laser, the predetermined amplitude of the voltage pulses being such that the value of the voltage gradient is high enough to inject sufficient power into the gaseous mixture to initiate lasing action without causing the occurrence of an arc streamer discharge, the duration of each voltage pulse being of such value that the energy injected by the pulse is substantially maximized without exceeding the value which, at said predetermined amplitude of the voltage pulse, would produce an arc streamer discharge in the gaseous mixture, and the predetermined pulse repetition rate being of such a value to provide an interval between pulses long enough to avoid causing an arc streamer discharge.

9. A carbon dioxide laser adapted for pulsed operation at high peak power and pulse repetition rate and comprising an envelope, a gaseous mixture of carbon dioxide gas and at least one auxiliary gas within said envelope, means for regulating the partial pressures of said gases at predetermined values, means defining a resonant cavity extending through said envelope, a pair of spaced electrodes disposed in operative relation to said gaseous mixture for supplying pumping energy thereto, electrical pulse generating means connected across said electrodes and the gaseous mixture to initiate lasing action, said predetermined amplitude, duration, and repetition rate, the predetermined duration of said pulses being in a range of values extending from a value as small as approximately two microseconds to higher values, the predetermined amplitude of the voltage pulses being such that the voltage gradient is high enough to inject sufficient power into the gaseous mixture to initiate lasing action, said predetermined values of partial pressures of said gases being at least three times greater than the optimum values utilized in a DC excited steady state laser, and the interval between pulses being long enough to avoid causing an arc streamer discharge.

10. A carbon dioxide laser adapted for pulsed operation at high peak power and pulse repetition rate and comprising; an envelope, means for introducing a gaseous mixture of carbon dioxide gas and at least one auxiliary gas into said envelope, means for regulating the partial pressures of said gases at predetermined values, a resonant cavity extending through said envelope, a pair of spaced electrodes disposed adjacent the envelope and adapted to supply pumping energy to a gaseous mixture within the envelope, a direct current power supply adapted to develop a high voltage, a storage capacitor connected to said power supply and adapted to be charged thereby, a stepup pulse transformer having a primary winding adapted to be connected across said capacitor and a secondary winding connected across said electrodes, and switching means operatively connected between said capacitor and the primary winding and adapted to discharge said capacitor through the primary winding at a predetermined magnitude of voltage on said capacitor and thereby produce a voltage pulse across the secondary winding of the transformer, said predetermined values of partial pressures of said gases being at least three times greater than the optimum values utilized in a DC excited steady state laser, the voltage developed by the secondary winding of said transformer being such that the voltage gradient in a portion of said envelope adapted to be occupied by said gaseous mixture is high enough to inject sufficient power into the gaseous mixture to initiate lasing action, and the interval between pulses being long enough to avoid causing an arc streamer discharge.

11. A carbon dioxide laser adapted for pulsed operation at high peak power and pulse repetition rate and comprising; an envelope, a gaseous mixture of carbon dioxide gas and at least one auxiliary gas within said envelope, means for regulating the partial pressures of said gases at predetermined values, a resonant cavity extending through said envelope, a pair of spaced electrodes disposed in operative relation to said gaseous mixture for supplying pumping energy thereto, a direct current power supply adapted to develop a high voltage, a storage capacitor connected to said power supply and adapted to be charged thereby, a step-up pulse transformer having a primary winding adapted to be connected across said capacitor and a secondary winding connected across said electrodes, and switching means operatively connected between said capacitor and the primary winding and adapted to discharge said capacitor through the primary winding at a predetermined magnitude of voltage on said capacitor and thereby produce a voltage pulse across the secondary winding of the transformer, said predetermined values of partial pressures of said gases being at least three times greater than the optimum values utilized in a DC excited steady state laser, the voltage amplitude of the pulses developed by the secondary winding of said transformer being such that the voltage gradient in said gaseous mixture is high enough to inject sufficient power into the gaseous mixture to initiate lasing action, the duration of said pulses being in a range of values extending from a value as small as approximately two microseconds to higher values, and the pulse repetition rate being of the order of 60 to 120 pulses per second, the interval between pulses being long enough to avoid causing an arc streamer discharge.

12. A carbon dioxide laser adapted for pulsed operation at high peak power and pulse repetition rate, and comprising; an envelope, a gaseous mixture of carbon dioxide gas and at least one auxiliary gas within said envelope, means for regulating the partial pressures of said gases at predetermined values, a resonant cavity extending through said gaseous mixture, a pair of spaced electrodes disposed in operative relation to said gaseous mixture for supplying pumping energy thereto, a direct current power supply adapted to develop a high voltage, a storage capacitor connected to said power supply and adapted to be charged thereby, a step-up pulse transformer having a primary winding adapted to be connected across said capacitor and a secondary winding connected across said electrodes, and switching means operatively connected between said capacitor and the primary winding and being responsive to a predetermined magnitude of voltage on said capacitor to discharge said capacitor through the primary winding and produce a voltage pulse across the secondary winding of the transformer, said predetermined values of partial pressures of said gases being at least three times greater than the optimum values utilized in a DC excited steady state laser, the voltage developed by the secondary winding of said transformer being such that the voltage gradient is at least 100,000 volts per meter and high enough to inject sufficient power into the gaseous mixture to initiate lasing action, the duration of each voltage pulse being of such value that the energy injected by the pulse is substantially maximized without exceeding the value which, at said voltage gradient, would produce an arc streamer discharge in the gaseous mixture, and the interval between the pulses being long enough to avoid causing an arc streamer discharge.

13. A carbon dioxide laser adapted for pulsed operation at high peak power and pulse repetition rate and comprising; an envelope, a source of a gaseous mixture including carbon dioxide and nitrogen gases, means for flowing said gaseous mixture through said envelope and regulating the partial pressures of said gases at predetermined values, a resonant cavity extending through said envelope, a pair of spaced electrodes disposed in operative relation to the gaseous mixture in said envelope for supplying pumping energy thereto, a direct current power supply adapted to develop a high voltage, a storage capacitor connected to said power supply and adapted to be charged thereby, a step-up pulse transformer having a primary winding adapted to be connected across said capacitor and a secondary winding connected across said electrodes, a spark gap connected between said capacitor and the primary winding and being adapted to become conductive at a predetermined magnitude of voltage on said capacitor whereby said capacitor is discharged through the primary winding to produce a voltage pulse across said electrodes, said predetermined values of partial pressure of said gases being at least three times greater than the optimum values utilized in a DC excited steady state laser, said predetermined magnitude of voltage and the turns ratio of said transformer being such that the voltage gradient in the gaseous mixture is at least 100,000 volts per meter and high enough to inject sufficient power into the gaseous mixture to initiate lasing action, the duration of each voltage pulse being on the order of a few microseconds, and the interval between pulses being long enough to avoid causing an arc streamer discharge.

14. A carbon dioxide laser adapted for pulsed operattion at high peak power and pulse repetition rate and comprising; an envelope adapted to contain a gaseous lasing medium including carbon dioxide and nitrogen gases within said envelope, means for regulating the pressure of said gases at values at least three times greater than the optimum values utilized in a DC excited steady state laser, a resonant cavity extending through said envelope, a pair of spaced electrodes disposed adjacent said envelope and adapted to supply pumping energy to said gaseous medium, a direct current power supply adapted to develop a high voltage, a storage capacitor connected through a charging circuit to said power supply and adapted to be charged thereby, a step-up pulse transformer having a primary winding adapted to be connected across said capacitor and a secondary winding connected across said electrodes, and a spark gap connected between said capacitor and the primary winding and adapted to become conductive at a predetermined magnitude of voltage on said capacitor to discharge said capacitor through the primary winding and produce a voltage pulse across said electrodes, said predetermined magnitude of voltage and the turns ratio of said transformer being such that the voltage gradient in said envelope is high enough to inject sufficient power into the gaseous medium to initiate lasing action, said charging circuit for said capacitor having a time constant of such value that the interval between pulses is long enough to avoid causing an arc streamer discharge.

References Cited

UNITED STATES PATENTS 2,471,401  5/1949  Ahier et al. _____ 331—127
3,351,870  11/1967  Goldsmith et al. ____ 331—94.5

OTHER REFERENCES

Boot et al.: Nature, vol. 197, Jan. 12, 1963, pp. 173–174.

McFarlane.: Appl. Phys. Letters, vol. 5, Sept. 1, 1964, pp. 91–93.

Paananen et al.: Proc. IEEE, vol. 51, July 1963, pp. 1036–1037.

Patel et al.: Appl. Phys. Letters, vol. 7, Dec. 1, 1965, pp. 290–292.

Vogel et al.: Electronics, Oct. 27, 1961, pp. 45–46.

ROY LAKE, Primary Examiner

S. H. GRIMM, Assistant Examiner

U.S. Cl. X.R.

330—4.3

CERTIFICATE OF CORRECTION

Patent No. 3,491,309    Dated January 20, 1970

Inventor(s) Alan Eugene Hill

It is certified that error appears in the above-identified patent and that said Letters Patent are hereby corrected as shown below:

Column 1, line 41, after "in" delete "a"; line 44, after "steady insert --state--.

Column 2, line 8, "elctro" should be --electro--.

Column 4, line 4, "three-fourth" should be --three-fourths--; line 58, "arks" should be --arcs--.

Claim 3, line 34, "product" should be --produce--.

Claim 9, beginning at line 31, "the gaseous mixture to initiate lasing action, said predetermined" should be deleted and --adapted to produce voltage pulses thereacross of predetermined should be substituted therefor.

SIGNED AND
SEALED
JUN 23 1970

(SEAL)
Attest:

Edward M. Fletcher, Jr.
Attesting Officer

WILLIAM E. SCHUYLER, JR.
Commissioner of Patents